United States Patent [19]

Orii et al.

[11] Patent Number: 4,853,198

[45] Date of Patent: Aug. 1, 1989

[54] PROCESS FOR PRODUCING UNSINTERED CRISTOBALITE SILICA

[75] Inventors: Koichi Orii; Iwao Ohshima, both of Yokohama; Naotake Watanabe, Yokosuka, all of Japan

[73] Assignees: Nitto Chemical Industry Co., Ltd; Mitsubishi Rayon Co., Ltd., both of Tokyo, Japan

[21] Appl. No.: 169,548

[22] Filed: Mar. 17, 1988

[30] Foreign Application Priority Data

Mar. 23, 1987 [JP] Japan .................................. 62-65746

[51] Int. Cl.⁴ .............................................. C01B 3/12
[52] U.S. Cl. ................................................... 423/335
[58] Field of Search ........................................ 423/335

[56] References Cited

U.S. PATENT DOCUMENTS

| | | | |
|---|---|---|---|
| 4,395,388 | 7/1983 | Kaduk | 423/339 |
| 4,683,128 | 7/1987 | Orii et al. | 423/339 |
| 4,738,838 | 4/1988 | Shinpo et al. | 423/339 |

FOREIGN PATENT DOCUMENTS

| | | | |
|---|---|---|---|
| 0186412 | 9/1985 | Japan | 423/335 |
| 0927748 | 5/1982 | U.S.S.R. | 423/335 |
| 1273831 | 5/1972 | United Kingdom | 423/335 |

*Primary Examiner*—John Doll
*Assistant Examiner*—Lori S. Freeman
*Attorney, Agent, or Firm*—Cushman, Darby & Cushman

[57] ABSTRACT

There is disclosed a process for producing unsintered cristobalite silica by heating an amorphous silica in the presence of an alkali component, which comprises heating an amorphous silica having a specific surface area (measured according to BET method) of 50 m²/g or more at a temperature in the range of 1000° to 1300° C., in the presence of an alkali metal element in a concentration of 5 to 600 ppm to said silica to change it partially or completely into cristobalite and then heating at a temperature of exceeding 1300° C. to eliminate alkali.

9 Claims, No Drawings

PROCESS FOR PRODUCING UNSINTERED CRISTOBALITE SILICA

FIELD OF THE INVENTION AND RELATED ART STATEMENT

The present invention relates to a process for producing unsintered cristobalite silica.

Transparent quartz glass is usually produced by Verneuil's method which comprises melting silica particles in argon-oxygen plasma flame or oxygen-hydrogen flame to vitrify it or by vacuum melting method which comprises heating and melting silica packed in a vessel under a high vacuum.

As a starting material of transparent quartz glass, there has hitherto been used natural quartz. However, though the demand of high purification on the starting material to be used becomes severe in accompany with enhancing the integration of LSI in the field of semiconductor, natural quartz with a high quality becomes to be exhausted. Therefore, researches have been done on substitution of natural quartz by synthetic silica having a high purity.

In the case where amorphous synthetic silica having a high purity is molten in above-mentioned process, there is a problem that high purification can be achieved but complete elimination of bubbles is very difficult so that the obtained quartz glass contains a large number of bubbles. It is considered that this is due to the high porosity and poor denseness of the starting silica.

As one process for solving this problem, there is proposed a process in which amorphous silica is changed into cristobalite which has a denser structure (Japanese Patent Application Kokai (Laid-Open) Nos. 61-58,822 and 61-58,823, etc.).

Though a transparent quartz glass free from bubbles can be produced by using the obtained cristobalite by the above-mentioned method, because the alkali metal component is added on formation of cristobalite and the amount thereof added is large so a large amount of alkali metal component is remained after molding, a problem on the quality is remained and the obtained cristobalite silica also has a defect that it is not suitable for Verneuil's method because it has been sintered.

SUMMARY OF THE INVENTION

An object of the present invention is to provide a process for producing unsintered granular cristobalite silica excellent in denseness efficiently and economically. In the present process, when the starting silica is used with a suitable choice, there can be obtained unsintered granular cristobalite silica having high purity and a very small content of impurities.

The process of the present invention can be used for changing multicomponent amorphous silica containing various elements in response to the use into unsintered particules excellent in denseness.

As the result of an extensive research on improvement in above-mentioned problems in the conventional process, the present inventors have found that in a process for producing cristobalite by heating amorphous silica in the presence of an alkali component, amorphous silica having a specific surface area (measured according to BET method) of 50 m$^2$/g or more is heated at a temperature in the range of 1000° to 1300° C. in the presence of an alkali metal element in a concentration of 5 to 600 ppm to said silica, whereby surprisingly obtaining cristobalite in the state not sintered but powdered and have achieved the present invention

DETAILED DESCRIPTION OF PREFERRED EMBODIMENT

According to the present invention, there is provided a process for producing unsintered cristobalite silica by heating amorphous silica in the presence of an alkali component, which comprises heating amorphous silica having a specific surface area (measured according to BET method) of 50 m2/g or more at a temperature in the range of 1000° to 1300° C. in the presence of an alkali metal element in a concentration of 5 to 600 ppm to said silica to change it partially or completely into cristobalite, and subsequently heating it at a temperature exceeding 1300° C. to eliminate the alkali component.

The present invention is described below in detail. The embodiment of the present invention comprises the following three steps.

Step 1: (Alkali component adjusting step)

The concentration of alkali component to starting silica is adjusted.

Step 2: (Cristobalite forming step)

The silica adjusted in the concentration of alkali component is subjected to heat-treatment at a temperature in the range of 1000° to 1300° C. to change partially or completely into cristobalite silica in the unsintered or agglomerated state.

Step 3: (Alkali eliminating step)

The resultant cristobalite silica is then subjected to heat-treatment at a temperature exceeding 1300° C to eliminate the alkali component, whereby obtaining cristobalite silica with a low alkali concentration in the unsintered or agglomerated state.

The term of "agglomeration" mentioned herein is defined as a state where though the heat-treated silica is agglomerated in the vessel, the silica is easily broken up into granular state by imparting a slight shock such that the silica in the vessel is vibrated together with the vessel, and the state is included in the unsintered state.

The above-mentioned three steps is described below in order.

[Step 1: (Alkali component adjusting step)]

The starting silica used in the present invention may be those obtained in any production process, that is, the production process is not critical, so long as amorphous silica having a specific surface area (measured according to BET method) of 50 m$^2$/ g or more. Such silica can be obtained, for example, in a process disclosed in U.S. Pat. No. 4,683,128, which had previously proposed by the present inventors et al.

That is, the amorphous silica having a specific surface area (measured according to BET method) of 50 m$^2$/ g or more can be obtained by extruding an aqueous solution of an alkali silicate represented by the general formula: $M_2O \cdot nSiO_2$ wherein M is an alkali metal element and n is a mole number of 0.5 to 5, of which viscosity has been adjusted in the range of 2 to 500 poises into a coagulating bath consisting of a water-soluble organic medium or an acid solution having a concentration of 4 normal or less through a spinning nozzle having a diameter o 1 mm or less to coagulate into fibrous form, treating the resultant fibrous gel with a liquid containing an acid and then washing it with water to remove impurities by extraction, or further heat-treating thus obtained silica at a temperature of 1000° C. or higher.

According to the above-mentioned process, there can be obtained a highly purified silica with a very small content of 1 ppm or less of various impurities including radio active materials such as uranium and the like; Al, Fe and the like as well as alkali metal elements and chlorine, and having a desired specific surface area.

According to another process, the silica can also be obtained by hydrolysis of alkoxysilane.

The starting silica for producing transparent quartz glass used in the field of semiconductor is better to have impurities as little as possible, and the contents of Al, P, B, alkali metal elements, transition metal elements such as Ti, Cr, Fe, Cu, Mo and the like are desirably 1 ppm or less, respectively.

In the case of conventional natural quartz, the content of Al is high and usually exceeds 10 ppm. Al is a hardly removable element so that it is hardly removed also by means such as heat-treatment, extraction with an acid and the like. Therefore, the synthetic silica having a low content of Al obtained in a process such as mentioned above is advantageous as the starting material for producing high pure quartz glass to be used in the field of semiconductor.

The starting silica used in the process of the present invention has a specific surface area measured according to BET method of 50 m$^2$/g or more, preferably in the range of 100 to 1000 m$^2$/g. When the specific surface area is less than 50 m$^2$/g, impregnation efficiency of an alkali component is low and crystallization rate in the treatment for forming cristobalite becomes low so it is not preferable. The larger the specific surface area is, the more preferable, but if it exceeds 1000 m$^2$/g, it is not preferable due to the tendency that sinterability of silica is increased.

Though the particle diameter of the starting silica used in the process of the present invention is not critical, when the cristobalite silica obtained is used as the starting material for producing transparent quartz glass by flame melting method, for practical use, it is 10 μm or more, preferably in the range of 20 μm to 5 mm, more preferably in the range of 50 to 400 μm, because if the particle diameter is too small, problems occur in productivity such as operating efficiency or the like, while if the particle diameter is too large, it becomes difficult to obtain uniform melting.

The starting silica used in the process of the present invention may be in the state of either wet powder or dry powder obtained by drying the wet powder.

The alkali metal element used in the process of the present invention is at least one element selected from the group consisting of Na, K and Li. These elements increase the rate of cristobalite formation of amorphous silica in a small amount thereof. Also, in the case of these elements, removal of the alkali metals after cristobalite formation can be easily accomplished.

In the process of the present invention, the concentration of the alkali metal element to the silica is adjusted to in the range of 5 to 600 ppm, preferably 5 to 200 ppm, more preferably 5 to 100 ppm. When the concentration of the alkali metal element is less than 5 ppm, the increasing degree of cristobalite formation rate of amorphous silica is unpractically low, while when it exceeds 600 ppm, a long time is unpreferably required for removal of the alkali.

In the process of the present invention, the concentration of the alkali metal element to the silica can be adjusted by adding one or more kinds of hydroxides or water-soluble salts such as carbonate and the like containing above-mentioned elements as the alkali component to the starting silica.

The alkali component is selectively concentrated and adsorbed into the starting silica having a large specific surface area, and acts as core forming agent of crystal in heat-treatment to increase the rate of cristobalite formation of the silica corresponding to the heat-treating temperature.

The method for adding the alkali component to the starting silica includes a method which comprises immersing the starting silica in an aqueous solution containing the alkali component, a method which comprises spraying an aqueous solution containing the alkali component to the starting silica and the like.

Among them, the immersing method is convenient and by the method, the starting silica can uniformly be impregnated with the alkali component having a constant concentration and can adsorb it.

When synthetic silica is produced in a wet process, it is reasonable that silica is impregnated with and adsorbs the alkali component by washing the silica with a washing liquid to which above-mentioned alkali component has been added.

Though the temperature in the impregnating treatment is not critical, the treatment is usually carried out at a temperature in the range of from room temperature to 50° C.

The starting silica may contain the alkali component in a concentration in the above-mentioned range of the present invention prior to the alkali component adjusting step and in this case, the amount of the alkali component to be added may be regulated suitably considering it.

It is preferable to use a starting silica having a concentration of the alkali metal of less than 5 ppm because removal of alkali after formation of cristobalite is easy much more.

[Step 2: (Cristobalite forming step)]

In this step, the silica having an adjusted concentration of the alkali component obtained in the step 1 is subjected to heat-treatment at a temperature in the range of 1000° to 1300° C, preferably 1100° to 1300° C, more preferably 1200° to 1300° C. to form cristobalite.

In the process of the present invention, at least the surfaces of the particles of silica are changed into cristobalite in this step up to the degree where particles of silica are not sintered to one another when the particles are subjected to heat-treatment at a temperature exceeding 1300° C. in the step 3.

Though the cristobalite forming rate becomes high if the heating temperature is raised, the temperature region exceeding 1300° C. is not preferable because the surfaces of the silica particles weld to one another to show a rigid sinterability and the resultant cristobalite silica is a sintered one so that the removal of the alkali component added is difficult and it requires a long time heat-treatment. Also, such sintered cristobalite silica is not preferable because when it is used as a starting material for producing transparent quartz glass by flame melting method, re-grinding is required and in the grinding, the silica is contaminated with impurities derived from the grinder.

Since the cristobalite forming rate is increased as the treating temperature is raised, it is advantageous to treat at a temperature in the range of 1000° to 1300° C and near 1300° C. as possible in this step.

The heat-treating time in this step is 20 minutes or more, preferably 1 to 10 hours.

The cristobalite forming degree can properly be regulated by combining the alkali concentration, the heat-treating temperature and the time.

The heat-treatment in the process of the present invention may be carried out in the atmosphere of oxygen, gaseous carbon dioxide or the like, if necessary, of an inert gas such as nitrogen, argon or the like. Air is preferable for practical use. The apparatus for carrying out the heat-treatment may be one capable of keeping the silica at a predetermined temperature and includes a tubular furnace, a box furnace, a tunnel furnace and the like as well as a fluidized calcining furnace and the like. The heating may be effected electrically or by gas-burning.

[Step 3 (Alkali eliminating step)]

In this step, alkali-eliminating treatment by heat diffusion is carried out. The granular silica partially or completely changed into cristobalite obtained in the step 2 is not sintered up to a temperature near the melting point thereof. Accordingly, in the process of the present invention, in order to eliminate the alkali component added in the cristobalite formation, the heat-treatment is carried out at a temperature in the range of from not lower than 1300° C. to lower than the temperature at which the resultant cristobalite silica shows sinterability.

Though the longer the treatment time is, the more the alkali elimination proceeds in this step, it is about 6 to about 20 hours for practical use.

The alkali elimination by heat diffusion is more easily accomplished on the granular cristobalite silica as compared with on the sintered cristobalite silica. To eliminate the alkali component scattered, the heat-treatment is preferably carried out under ventilative conditions, and in particular in the case of the silica which has been changed into cristobalite by a small amount of the alkali added as in the process of the present invention, the effect is notable.

According to the process of the present invention, there can be obtained unsintered granular cristobalite silica with a low concentration of alkali and a high denseness.

Further, by properly selecting the starting silica to be used, there can be obtained highly puried unsintered granular cristobalite silica which is high pure as the content of impurities such as alkali metals and the like is very low and has a regulated particle diameter distribution and a high denseness.

The cristobalite silica obtained according to the process of the present invention can be used as filler, dispersant and the like as well as suitably used as starting materials for synthetic quartz with a high quality, ceramics and the like, particularly as starting material for transparent quartz glass. Moreover, the process of the present invention is also advantageous in production cost capable of decreasing as compared with the conventional process.

The process of the present invention is explained below in more detail referring to Examples, Reference Examples and Comparative Examples.

EXAMPLE 1

Dry powder (moisture content of 8%) of silica having a specific surface area of 779 $m^2/g$ (measured according to BET method), a particle diameter ranging from 30 μm to 400 μm and a concentration of Al, Na, K and Li of 1 ppm or less, respectively, was used as the starting material.

A solution for alkali (Na) component impregnation was prepared by adding 8 ml of a 0.01N aqueous NaOH solution to 905 ml of ion-exchanged water. In the solution kept the temperature at 50° C. was immersed 87 g of the above-mentioned silica and subjected to alkali-treatment for 1 hour with stirring. After the alkali-treatment, the silica was separated from the liquid and then dried at 150° C. overnight.

Liquid content of the Na-impregnated silica before drying was about 150% based on the weight of dry silica, the concentration of Na adsorbed was 20 ppm and the weight of the Na-impregnated silica obtained after drying was 86.5 g.

Subsequently, a crucible (6 cmφ×7.5 cm H) made of alumina was packed with 30 g of the Na-impregnated silica, heated at 1290° C. for 2 hours and further heated at 1400° C. for 8 hours.

The granular silica obtained has a specific gravity of 2.33 and was confirmed as cristobalite silica also from the result of X-ray diffraction. It was a unsintered cristobalite silica with a high purity with concentrations of Al of less than 1 ppm, K and Li of less than 0.1 ppm, respectively, and a concentration of Na of 0.6 ppm.

EXAMPLE 2

To a solution for Na component impregnation prepared by adding 8 ml of a 0.01N aqueous NaOH solution to 768 ml of ion-exchanged water was added 224 g of wet powder (moisture content to silica of 180%) of silica before drying having a specific surface area of 800 $m^2/g$ (measured according to BET method), a particle diameter ranging from 30 μm to 400 μm and a concentration of Na, K and Li of 1 ppm or less, respectively, and subjected to alkali-treatment for 1 hour with keeping the temperature at 50° C. with stirring. After the alkali-treatment, the silica was treated in the same manner as in Example 1, to obtain Na-impregnated silica (concentration of Na: 21 ppm).

Subsequently, the silica was subjected to heat-treatment in the same manner as in Example 1 to obtain agglomerated silica. The silica which had been heat-treated was imparted with a slight shock by vibrating together with the vessel to break up into granular state.

The granular silica obtained had a specific gravity of 2.33 and was confirmed as cristobalite silica also from the result of X-ray diffraction. It was a unsintered cristobalite silica with a low alkali content in which concentrations of K and Li was less than 0.1 ppm, respectively, and a concentration of Na was 0.7 ppm.

EXAMPLE 3

Dry powder of silica having a specific surface area of 100 $m^2/g$ (measured according to BET method), a particle diameter ranging from 10 μm to 400 μm and a concentration of Na to 12 ppm was subjected to alkali treatment according to the same manner as in Example 1 to obtain a Na-impregnated silica (Na-concentration: 25 ppm).

Subsequently, the silica was subjected to heat-treatment in the same manner as in Example 1 to obtain agglomerated silica. The silica which had been heat-treated was imparted with a slight shock by vibrating together with the vessel to break up into granular state.

The granular silica obtained had a specific gravity of 2.32 and was confirmed as cristobalite silica also from the result of X-ray diffraction.

REFERENCE EXAMPLE 1 AND COMPARATIVE EXAMPLE 1

Dry powders of silica impregnated with alkali prepared according to the same manner as in Example 1 were subjected to the first step of heat-treatment at a temperature of 800° C, 1200° C, 1300° C. and 1400° C, respectively, for 7 hours. The results shown in Table 1 were obtained.

TABLE 1

Influence of Temperature on Heat-Treatment of the First Step

|  | No. | Na—Concentration, ppm Solution for impregnation, *1 | Na—impregnated silica | Heat temp. in first step | Silica after heat-treatment Na Conc. (ppm) | Specific gravity |
|---|---|---|---|---|---|---|
| Reference | 1-1 | 125 | 115 | 1200 | 98 | 2.30 |
| Example | 1-2 | " | " | 1300 | 30 | 2.33 |
| Comparative | 1-1 | " | " | 800 | 105 | 2.19 |
| Example | 1-2 | " | " | 1400 | 0.9 | 2.33 |

*1 Value to starting silica

From the result of X-ray diffraction, the silica obtained was confirmed as cristobalite silica and obtained as unsintered or agglomerated body in each case in Reference Examples.

In Comparative Example 1-1, the silica was not changed into cristobalite but remained in amorphous state. In Comparative Example 1-2, the silica was changed into cristobalite but found as strongly sintered so that it could not break up into granules without use of a grinder.

EXAMPLE 4

Aqueous NaOH solutions having different concentrations were prepared. Starting silica in the same lot as in Example 1 was treated therewith in the same manner as in Example 1 to obtain silica impregnated with Na different in Na concentration. These Na-impregnated silica were subjected to heat-treatment under the same conditions as in Example 1 to obtain the results shown in Table 2.

TABLE 2

Influence of Na Concentration

|  | No. | Na Concentration, ppm Solution for impregnation *1 | Na—impregnated silica | Silica after heat-treatment Na Concentration (ppm) | Specific gravity |
|---|---|---|---|---|---|
| Example | 4-1 | 10.0 | 9.5 | 0.4 | 2.33 |
| Example | 4-2 | 56 | 52 | 0.7 | 2.33 |
| Example | 4-3 | 98 | 92 | 0.8 | 2.34 |
| Example | 4-4 | 125 | 115 | 1.0 | 2.34 |
| Example | 4-5 | 230 | 190 | 1.5 | 2.33 |
| Example | 4-6 | 800 | 510 | 8.5 | 2.33 |

*1 Value to starting silica

In each Example, the silica was confirmed as cristobalite silica from the result of X-ray diffraction and was unsintered or agglomerated one.

EXAMPLE 5 AND COMPARATIVE EXAMPLE 2

Each highly pure silica having a particle diameter of 30 to 400 μm, different specific surface area and concentration of alkali metal element of 1 ppm or less was subjected to Na-impregnation and then to heat-treatment to obtain the results shown in Table 3.

TABLE 3

Influence of Specific Surface Area of Starting Silica

|  | No. | Specific surface area of silica (m²/g) | Na Concentration, ppm Solution for impregnation *1 | Na—impregnated silica | Silica after heat-treatment Na concentration (ppm) | Specific gravity |
|---|---|---|---|---|---|---|
| Example | 1 | 779 | 23 | 20 | 0.6 | 2.33 |
|  | 5-1 | 450 | " | 19 | 0.6 | 2.34 |
|  | 5-2 | 260 | " | 18 | 0.7 | 2.33 |
| Comparative | 2-1 | 10.4 | " | 5.8 | 4.5 | 2.21 |
| Example | 2-2 | 0.4 | " | 1.7 | 1.6 | 2.22 |

*1 Value to starting silica

In each Example, the silica was confirmed as cristobalite silica from the result of X-ray diffraction and was unsintered or agglomerated one.

In each Comparative Example, the silica remained as amorphous one and was sintered so that it was prevented from alkali elimination.

EXAMPLE 6

Solutions for impregnation having different kinds of alkali components were prepared. Starting silica in the same lot as in Example 1 was treated therewith in the same manner as in Example 1. Subsequently, the resultant alkali-impregnated silica was subjected to heat-treatment under the same conditions as in Example 1 to obtain the results shown in Table 4.

TABLE 4

| | | | Influence of Kind of Alkali Component | | | |
|---|---|---|---|---|---|---|
| | | | Alkali concentration, ppm | | Silica after heat-treatment | |
| | No. | Kind of alkali metal element | Solution for impregnation *1 | Alkali-impregnated silica | Alkali concentration (ppm) | Specific gravity |
| Example | 6-1 | K | 23 | 18 | 0.5 | 2.34 |
| | 6-2 | Li | " | 15 | 0.8 | 2.33 |
| | 6-3 | Na 50 | 11.5 | 8.1 | 0.5 | |
| | | K 50 | 11.5 | 9.2 | 0.3 | 2.33 |

*1 Value to starting silica

In each case, the silica was confirmed as cristobalite silica from the result of X-ray diffraction and was unsintered or agglomerated one.

What is claimed is:

1. A process for producing unsintered cristobalite silica by heating an amorphous silica in the presence of an alkali component, which comprises heating an amorphous silica having a specific surface area (measured according to BET method) of 50 m²/g or more at a temperature in the range of 1000° to 1300° C. in the presence of an alkali metal component in a concentration of 5 to 600 ppm to said silica to change it partially or completely into cristobalite and then heating at a temperature exceeding 1300° C to eliminate alkali.

2. A process for producing unsintered cristobalite silica according to claim 1, wherein the specific surface area of said amorphous silica is 100 to 1000 m²/g.

3. A process for producing unsintered cristobalite silica according to claim 1, wherein the alkali metal is at least one selected from the group consisting of Na, K and Li.

4. A process for producing unsintered cristobalite silica according to claim 1, wherein said concentration of said alkali metal component to said amorphous silica is to 200 ppm.

5. A process for producing unsintered cristobalite silica according to claim 1, wherein said concentration of said alkali metal component to said amorphous silica is to 100 ppm.

6. A process for producing unsintered cristobalite silica according to claim 1, wherein said temperature for changing into cristobalite is 1100° to 1300° C.

7. A process for producing unsintered cristobalite silica according to claim 1, wherein said temperature for changing into cristobalite is in the range of 1200° to 1300° C 8. A process for producing unsintered cristobalite silica according to claim 1, wherein said alkali elimination treatment is effected at a temperature greater than 1300° C., but below the temperature at which cristobalite silica is sintered.

9. A process for producing unsintered cristobalite silica according to claim 1, wherein said amorphous silica is one obtained in any process described below:

Ⓐ A process which comprises extruding an solution of an alkali silicate represented by the general formula: $M_2OnSiO_2$ wherein M is an alkali metal and n is a mole number of 0.5 to 5, said solution having a viscosity in the range of 2 to 500 poises into a coagulating bath consisting of a water-soluble organic medium or an acid solution having a concentration of 4N or less through a spinning nozzle having a diameter of 1 mm or less to coagulate into fibrous form, treating the resultant fibrous gel with a liquid containing an acid and then washing it with water to remove impurities by extraction, and Ⓑ A process which comprises further subjecting the silica obtained according to the process of above-mentioned Ⓐ to heat-treatment at a temperature of 1000° C or higher.

* * * * *